Sept. 23, 1969    R. K. SEDGWICK ET AL    3,468,179
RECIRCULATING BALL WORM DRIVE
Filed March 26, 1968    3 Sheets-Sheet 1

INVENTORS
ROBERT K. SEDGWICK
JOHN J. HUGHES
BY
Robert C Jones

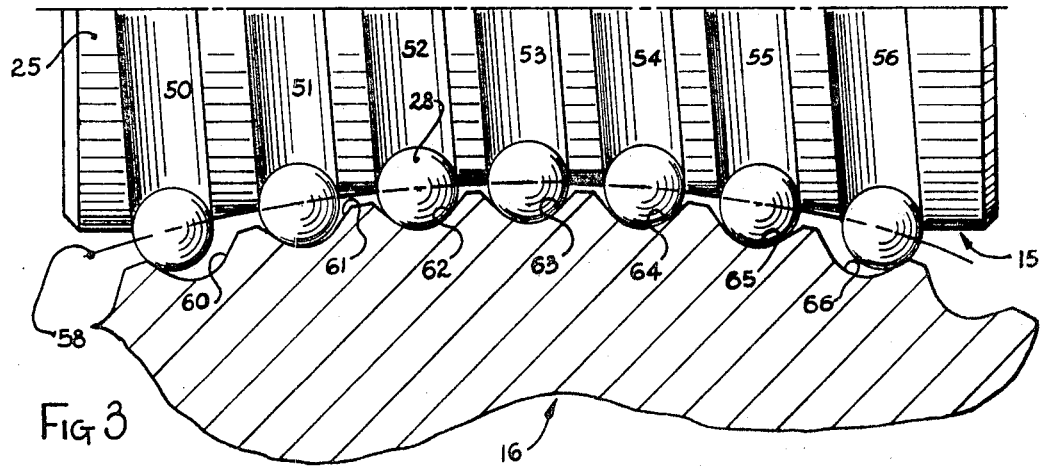
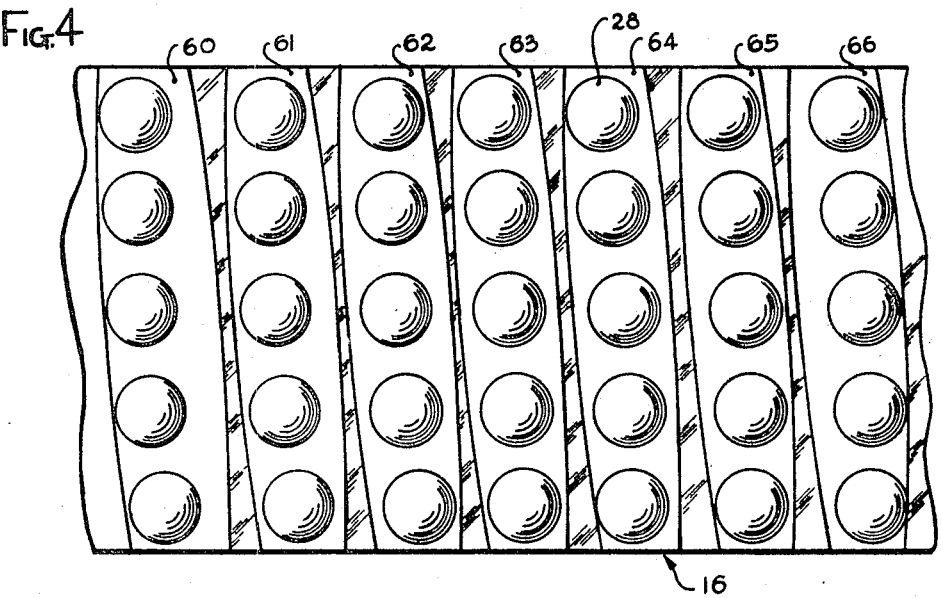
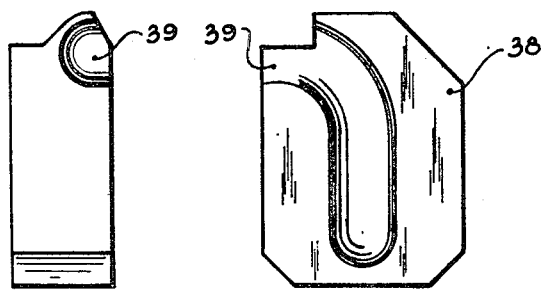

Patented Sept. 23, 1969

3,468,179
RECIRCULATING BALL WORM DRIVE
Robert K. Sedgwick, Brookfield, and John J. Hughes, Greendale, Wis., assignors to Kearney & Trecker Corporation, West Allis, Wis., a corporation of Wisconsin
Filed Mar. 26, 1968, Ser. No. 716,133
Int. Cl. F16h *1/16, 55/24*
U.S. Cl. 74—425
8 Claims

ABSTRACT OF THE DISCLOSURE

A recirculating ball worm drive utilizes a worm with a concave contour having a helical groove cut along its concave surface with the groove so oriented that the locus of ball centers that travel in the groove forms an hyperboloid of revolution. Because the worm groove is shaped so that the ball centers form a hyperboloid of revolution, parallelism of the grooves in the worm and wheel is maintained and the lead is allowed to vary while still maintaining contact of the balls in both worm grooves and wheel grooves. With this arrangement a plurality of balls in a plurality of rows will simultaneously operate to transmit driving torque.

Background of the invention

This invention relates to a recirculating ball worm gear drive which utilizes an enveloping worm.

It has been recognized for some time that, just as the recirculating ball screw has made it practical to transmit linear power efficiently, so might a recirculating ball worm, if it could be made, transmit rotary power without the backlash necessarily associated with the steel and bronze worm gears now in use, and without their extremely high power loss.

To get the desired result, an enveloping worm which would allow a plurality of balls in a plurality of rows to be loaded at the same time is necessary, in order to have good power transmitting capacity. The prior hourglass shaped worms have a groove cut in them such that the locus of ball centers in longitudinal section forms a circular arc shape which allows only one or two balls at the pitch point or immediately adjacent to it to be loaded. This produces a geometric situation whereby multiple ball, multiple row contact is impossible. This is true because for each groove of the worm to remain directly opposite each groove in the wheel, the worm would have to have constant circumferential lead, whereas for each worm groove to remain parallel to the corresponding wheel groove it would be required that the helix angle remain constant.

For contact across any appreciable portion of the wheel face, the helix angle of the enveloping worm has to be constant, which in combintion with the varying diameters of the worm, produces variable pitch. Since the wheel obviously has equally spaced grooves, the disparity between the spacing of the wheel grooves and successive turns of the worm gets larger as the pitch point is left behind. Thus, in prior enveloping worms in which the locus of ball centers, of the ball traveling in the worm groove, forms a circular arc shape, simultaneous loading of a plurality of balls in a plurality of grooves is not possible.

Summary of the invention

According to this invention, an enveloping recirculating ball worm drive assembly is provided with a column of ball bearings that are arranged to engage in cooperating grooves formed in an associated worm wheel to mesh the worm and worm wheel together.

The worm has an enveloping contour, wherein the worm groove is so orientated that the locus of ball centers, of the balls traveling in the groove, forms a shape other than a circular arc in longitudinal section. A worm whose groove is so orientated that the locus of ball centers forms an hyperbolic shape is a preferred example of a shape other than circular although many other concave shapes other than a hyperbolic shape may be utilized. The enveloping worm is made to operate in recirculating ball fashion while maintaining parallelism of the grooves in the worm and the wheel and maintaining contact of the balls in both the worm grooves and the wheel grooves. The balls will crawl up the sides of the wheel groove to compensate for the growing disparities between the circular pitches.

The enveloping worm is enclosed in a ball guide cage, and cooperates with a portion of a worm wheel which extends through an opening provided in the cage. When the enveloping worm rotates, the helical groove in the worm advances a column of balls in the direction of rotation and in so advancing, the balls roll through the grooves of the wheel to cause the wheel to rotate. The enveloping worm has a ball return passageway drilled diagonally therein. Pickup scoops located at the ends of the helical groove in the worm communicate with the diagonal ball return passageway, so that the balls coming from one end of the helical groove are constantly fed back to the other end.

It is the general object of this invention to provide a recirculating ball worm drive system which utilizes an enveloping worm whose groove is oriented so that the locus of ball centers forms a contour other than that of a circular arc in longitudinal section.

It is another object of this invention to provide a recirculating ball worm system which will allow multiple balls in multiple rows to be loaded at the same time to provide high capacity.

It is another object of this invention to provide a high efficiency recirculating ball worm drive system.

It is a further object of this invention to provide a recirculating ball worm drive system which has high overall system stiffness with extremely low backlash.

It is a further object of this invention to provide a worm drive system which does not use large amounts of lubricant for cooling purposes.

The foregoing and other objects of this invention, which will become more fully apparent from the following detailed description may be achieved by the exemplifying apparatus depicted and set forth in the specification in connection with the accompanying drawings, in which:

Description of the drawings

FIG. 3 is an enlarged fragmentary view of the balls as they fit in the grooves of the worm and the worm wheel.

FIG. 4 is a developed view of the worm wheel depicted in FIG. 3, illustrating the paths the balls take in the grooves of the worm wheel.

FIG. 5 is a view in front elevation of a ball pickup scoop; and,

FIG. 6 is a view in side elevation of the ball pickup scoop illustrated in FIG. 5, showing the guide groove therein.

Description of the preferred embodiment

Figure 1:
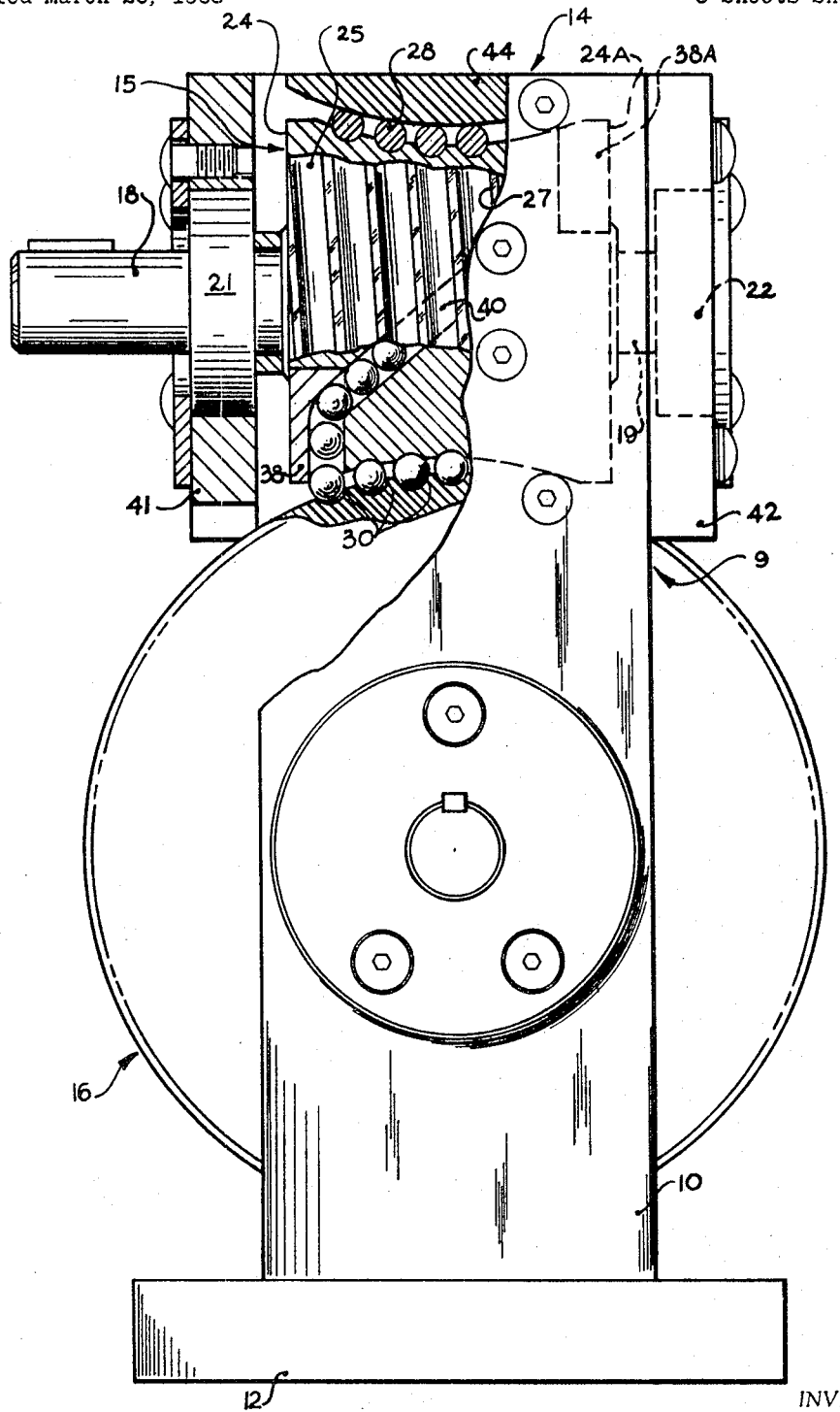
FIG. 1 is a view in side elevation of a ball drive transmission embodying the present invention, with parts broken away to show the relationship of the worm, the worm wheel and the balls.
Figure 2:
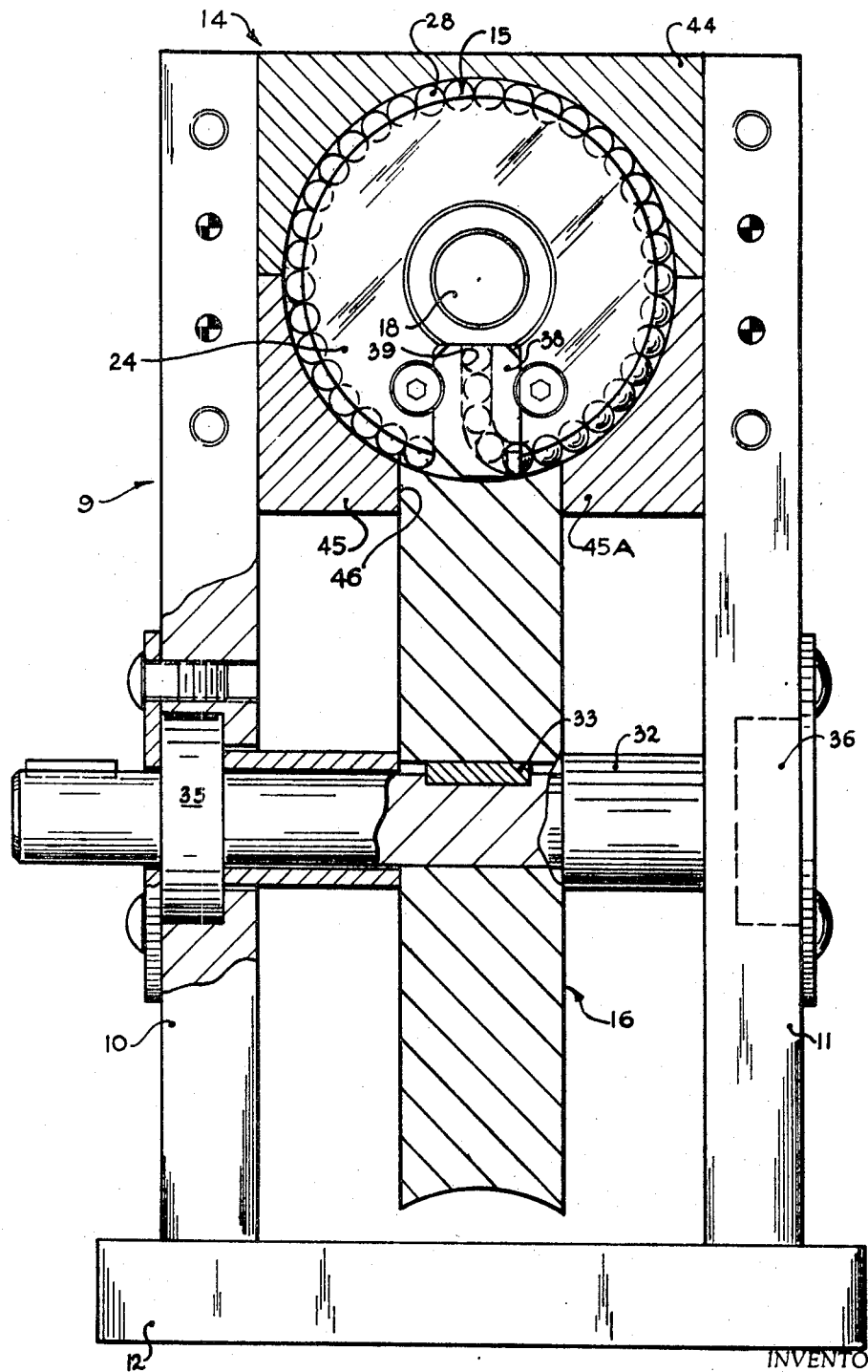
FIG. 2 is a front view with end plate removed partly in vertical section and partly in elevation of the ball drive transmission illustrated in FIG. 1, showing the internal operating mechanism.

Referring now to the drawings, and more specifically to FIGS. 1 and 2 thereof, illustrating an enveloping, recirculating ball worm drive assembly incorporating the features of the present invention, the assembly comprises generally a frame 9 having two spaced apart uprights 10 and 11 which are fixedly supported on a base 12. A ball guide cage 14 is fixedly supported between the uprights 10 and 11. Rotatably mounted in the cage 14 is an enveloping worm 15 having a concave shaped contour. A worm wheel 16 is rotatably supported between the spaced apart uprights 10 and 11 in cooperative relationship with the cage 14.

As shown in FIG. 1, the worm 15 is turned down on both ends to provide shafts 18 and 19. The shafts 18 and 19 are rotatably supported by bearings 21 and 22, respectively, which are carried by the ball guide cage 14. Worm 15 has circular shaped ends 24 and 24A adjacent to the shafts 18 and 19, respectively. The body portion 25 of the worm 15 between the ends 24 and 24A is formed in a manner which generally presents an hourglass configuration having a minor diameter midway between the ends 24 and 24A.

The concave shaped body portion 25 of the worm 15 is provided with a helical groove 27, having a plurality of turns, running from one end 24 to the other end 24A. The groove 27 is oriented so that the locus of ball centers, of the balls that travel in that groove, forms an hyperboloid of revolution. By forming the groove such that the locus of ball centers forms a non-circular shape, discrepancies in pitch between successive grooves on the worm can occur without loosening the balls in the grooves because of the varying proximity of the worm to the wheel. Although the groove of the worm is oriented so that the locus ball centers forms an hyperboloid of revolution in the preferred embodiment of this invention, it is to be understood that other non-circular shapes formed by the locus of centers of the balls will provide an operable structure. The degree of departure from the hyperbolic shape to other non-circular curve shapes produces a whole family of different corresponding groove shapes. The shape elected will depend upon the proportions such as the ratio of ball diameter to worm diameter and wheel diameter, and the number of grooves on each side of the pitch point for which contact is desired. When further contact is desired the lengthening of the concave portion will be accompanied by the opening of the groove shape. The limit comes when the curvature near the end of the worm fades away so rapidly that the balls become loose and incapable of carrying load.

Groove 27 suports a plurality of balls 28 in rolling relation therein with about one-half of the surfaces of the balls being confined in the groove 27 and the other half of the surfaces of the balls projecting from the groove 27 to cooperate in rolling interengagement with the worm wheel 16. The balls 28 act as an antifriction medium between the worm 15 and the wheel 16. Worm wheel 16 has a plurality of grooves 30, each of which is complementary to the helical groove 27 of the worm 15.

As shown in FIG. 2, the worm wheel 16 is supported on a horizontal shaft 32 and is drivingly connected thereto by a key 33. The shaft 32 is rotatably supported by bearings 35 and 36 carried by the vertical uprights 10 and 11, respectively.

Pickup scoops 38 and 38A are secured to the ends 24 and 24A of the worm 15 being recessed therein and operated to deliver the scooped-up balls to a return passage 40, shown in FIG. 1, drilled diagonally through the worm 15. The balls 28 exit from the return passage 40 and are supplied to the groove 27 in a continuous flow. FIGS. 5 and 6 shows a front and side view of the pickup ball scoop 38, which is identical to the scoop 38A. As shown, the pickup scoop 38 has a groove 39 cut in it that transmits the balls 28 from the worm groove 27 to the passageway 40 on one end and from the passageway 40 to the worm groove 27 on the opposite end via the scoop 38A and depending upon the direction in which the worm is rotated.

As shown in FIG. 1, the ball guide cage 14 encloses the worm 15 and the balls 28 which are disposed in the worm groove 27. The ball guide cage 14 has two end plates 41 and 42 which are attached to the sides of the vertical uprights 10 and 11. The worm bearings 21 and 22 are mounted in the end plates 41 and 42, respectively. As shown in FIG. 2, the cage 14 also includes an upper half-portion 44 which in cross-section presents a semi-hyperboloid of revolution configuration that make up the top section of the cage 14, as illustrated in FIG. 1. The lower portion of the cage 14 is formed of two segments 45 and 45A, each of which in cross-section present semi-hyperboloidal configuration. The two segments 45 and 45A cooperate with the upper portion 44 in a manner to present an opening 46 through which the worm wheel 16 extends to present its complementary grooves 30 into driving engagement with the balls 28 in the worm groove 27. The worm groove is oriented so that the locus of ball centers is an hyperboloid of revolution. The cage 14 mating with the worm 15 is effective to hold the column of balls in the groove 27 of the worm 15 since it closely conforms with the hourglass configuration of the concave portion 25 of the worm 15 and forms an outer race for the balls 28.

When shaft 18 is rotated to turn the worm 15, the pitch of the helical grove 27 in the worm advances the column of balls in the direction of rotation. In so advancing, the balls 28 roll into the grooves 30 of the worm wheel 16 to effect its rotation.

When the device is utilized as a speed reduction transmission a rotary input drive will be applied to the shaft 18 to drive the balls 28. Under this condition the balls 28 turning on themselves will travel in the groove 27 and cooperate with the grooves 30 of the worm wheel 16 to effect the rotation of the wheel 16 at reduced speed. The balls 28 travel until they reach the pickup scoop 38 of the worm 15 where they enter the pickup scoop groove 39 and are communicated to the diagonal passages 40 whereby they travel to the other end of the worm where they re-engage in the grooves 27 and 30, thus completing a cycle of travel through a closed recirculating ball system. The transmission of the rotary motion of the shaft 18 to the wheel shaft 32 is made by the balls in rolling interengagement with worm groove 27 and wheel groove 30. For a complete revolution of worm shaft 18, the wheel shaft 32 will rotate only a fraction of a revolution, thus it is being driven at a reduced rate of speed but with an increase in torque.

When the wheel shaft 32 functions as the input drive shaft whose rotary movement is transmitted, in a method inverse to that described above, to the output worm shaft 18, the worm shaft 18 is driven at a higher speed but with a reduction in the torque.

FIGS. 3 and 4 show how the balls 28 which are disposed in the individual turns 50 through 56 of the helical groove 27 cooperate with adjacent wheel grooves 60 through 66. A line 58 drawn through the locus of ball centers forms an hyperboloid of revolution which is used in the preferred embodiment because the radius of curvature of an hyperbola is relatively small near its center allowing the pitch of the worm grooves to change without reducing the loading on the balls which are in interengagement with the worm 15 and the wheel 16. With the balls 28 in the worm groove over the length of the worm body 25 disposed in cooperation with the complementary grooves of the wheel 16, they each share the load and each ball imparts a drive between the worm groove and wheel groove in which it is confined at the particular moment.

With a worm 15 of variable diameter, but constant helix angle, the pitch of the grooves will change and consequently the balls 28, which are riding in the complementary grooves of the worm 15 and the wheel 16, will tend to ride up the sides of the grooves in the wheel. The pitch between turns of the worm groove increases as the worm diameter becomes larger effecting the balls 28 to roll up the sides of the wheel grooves whose pitch between grooves remains constant. The position of the balls 28 in grooves 60, 61, 62, 64, 65 and 66 of the wheel shows that as the surface of the worm body adjacent the worm wheel recedes somewhat from the wheel, the balls roll up the sides of the grooves to maintain contact and thereby effect a sharing of the load. As can be seen from observing the relation of the balls in wheel grooves 60, 61, 62, 64, 65 and 66, a ball will roll farther up the side of the groove the more the worm surface recedes from the wheel. With a plurality of balls in driving engagement, the backlash between the worm 15 and the worm wheel 16 is minimized. This is true because the balls in the worm groove turns 60, 61 and 62 will stress the gear assembly tangentially in one direction and the balls in the worm groove turns 64, 65 and 66 will stress the gear assembly tangentially in the opposite direction, as illustrated in FIG. 3, and as a result will tend to eliminate backlash from the system.

FIG. 4 clearly illustrates the relationship of the balls 28 as they position themselves in the grooves 60 through 66 of the wheel 16. Wheel groove 63, which is the groove opposite the mid-point of the concave portion 25 of the worm 15, shows the balls 28 disposed at the bottom of the groove. Wheel grooves 62, 61 and 60 show how the balls 28 begin to position themselves to the left and up the sides of the grooves as the surface of the worm 15 recedes from the wheel 16. Wheel grooves 64, 65 and 66 show how the balls position themselves to the right and up the sides of the grooves as the surface of the worm 15 recedes from the wheel 16. The balls move farther up the sides of the wheel grooves as the distance between the worm 15 and wheel 16 gets greater.

From the foregoing detailed description of the illustrative embodiment set forth herein to exemplify the present invention, it will be apparent that there has been provided an improved recirculating ball worm drive which utilizes an enveloping worm whose groove is oriented so that the locus of ball centers forms a shape which has a varying radius of curvature which is relatively small near its center and which will allow a plurality of balls in a plurality of rows to be loaded at the same time.

From the above descriptiion of a preferred embodiment of our invention, it will be apparent that variations in any of the structures may be made without departing from the spirit and scope of the invention and that the scope of the invention is to be determined from the scope of the following claims.

What we claim is:
1. In a recirculating ball worm gear assembly:
   a frame;
   a worm rotatably supported in said frame, having a concave contour with a multi-turn helical groove cut along the said contour surface, said groove being oriented so that the locus of center of the balls that travel in the groove form a non-circular configuration in longitudinal section in a plane extending radially from the axis of the worm;
   a worm wheel rotatably supported in said frame, having grooves which are complementary to the said helix groove in said worm;
   a plurality of balls in rolling interengagement with said worm and wheel grooves; and
   means to recirculate said balls from one end of said groove to the opposite end in a continuous path.

2. A recirculating ball worm gear according to claim 1, wherein said means to recirculate said balls includes pick-up scoops which are secured to the ends of said worm in communication with the ends of said helical groove cut in said worm; and, there is provided a return passage formed through said worm which provides a return path for said balls so they can recirculate from one end of the worm groove to the other in a continuous path.

3. A recirculating ball worm gear assembly according to claim 1, wherein said plurality of balls are in interengagement with said individual turns of said worm helical groove and complementary wheel grooves to provide a plurality of contact points to develop tangential oppositely directed load components in the worm to hold backlash to a minimum.

4. A recirculating ball worm gear assembly according to claim 1, wherein said groove is oriented so that the locus of ball centers forms an hyperboloid of revolution in profile.

5. In a recirculating ball worm gear assembly;
   a frame;
   a worm rotatably supported in said frame, having a concave contour and having a multi-turn helical groove cut along said contour surface, said turns of said groove having a changing pitch;
   a worm wheel rotatably supported in said frame, having grooves which are complementary to said helical groove in said worm;
   a plurality of balls in rolling interengagement with said worm and wheel grooves; whereby as the surface of the worm body recedes from the surface of the worm wheel, said balls will roll up the sides of said wheel grooves to provide a plurality of contact points and thereby effect a sharing of the load; and
   means to recirculate said balls.

6. A recirculating ball worm gear according to claim 5, wherein said turns of said helical worm groove have a constant helix angle.

7. A recirculating ball worm gear according to claim 5, wherein the pitch between said turns of said worm groove becomes larger in both directions from the midpoint of the worm to its outer ends.

8. A recirculating ball worm gear according to claim 5, wherein the pitch between the grooves formed in said worm wheel is constant.

References Cited
UNITED STATES PATENTS

| | | | |
|---|---|---|---|
| 2,664,760 | 1/1954 | Booth | 74—458 |
| 2,995,947 | 8/1961 | Grabowski | 74—459 |
| 3,053,105 | 9/1962 | Cole | 74—459 X |
| 3,266,334 | 8/1966 | Zak | 74—458 |

LEONARD H. GERIN, Primary Examiner

U.S. Cl. X.R.
74—409, 441